United States Patent
Kienle et al.

(10) Patent No.: US 10,760,699 B2
(45) Date of Patent: Sep. 1, 2020

(54) VALVE ACTUATING THERMAL DISK ASSEMBLY

(71) Applicant: Faurecia Emissions Control Technologies, Germany GmbH, Augsburg (DE)

(72) Inventors: Boris Kienle, Biberbach (DE); Otto Steinhauser, Augsburg (DE); Gregoire Boulard, Bavans (FR)

(73) Assignee: Faurecia Emissions Control Technologies, Germany GmbH, Augsburg (DE)

( * ) Notice: Subject to any disclaimer, the term of this patent is extended or adjusted under 35 U.S.C. 154(b) by 256 days.

(21) Appl. No.: 15/641,443

(22) Filed: Jul. 5, 2017

(65) Prior Publication Data

US 2018/0010707 A1 Jan. 11, 2018

(30) Foreign Application Priority Data

Jul. 11, 2016 (DE) .......................... 10 2016 112 694

(51) Int. Cl.
| | |
|---|---|
| *F16K 31/04* | (2006.01) |
| *F16K 1/22* | (2006.01) |
| *F02M 26/70* | (2016.01) |
| *F02M 26/54* | (2016.01) |
| *F02D 9/04* | (2006.01) |

(52) U.S. Cl.
CPC ............ *F16K 31/041* (2013.01); *F16K 1/221* (2013.01); *F02D 9/04* (2013.01); *F02M 26/54* (2016.02); *F02M 26/70* (2016.02)

(58) Field of Classification Search
CPC ....................................................... F16F 1/328
See application file for complete search history.

(56) References Cited

U.S. PATENT DOCUMENTS

| | | | | |
|---|---|---|---|---|
| 2,019,160 | A * | 10/1935 | Semsch ...................... | F16J 3/00 417/412 |
| 2008/0017816 | A1* | 1/2008 | Willats ...................... | F02D 9/04 251/77 |
| 2009/0293654 | A1 | 12/2009 | Pintauro | |

FOREIGN PATENT DOCUMENTS

| | | | |
|---|---|---|---|
| DE | 1030102 | 5/1958 | |
| DE | 2600946 A1 * | 7/1977 | .............. F16F 1/328 |
| WO | 2016124720 | 8/2016 | |

OTHER PUBLICATIONS

DE 2600946A1—Translation—EPO (Year: 1977).*
Search Report from German counterpart application dated May 24, 2017, plus English summary.

* cited by examiner

*Primary Examiner* — Daphne M Barry
(74) *Attorney, Agent, or Firm* — Carlson, Gaskey & Old, P.C.

(57) ABSTRACT

A valve actuating device, in particular for an exhaust system, comprises a disk assembly, an actuating arm, and a valve actuator wherein the disk assembly is arranged between the actuating arm and the valve actuator. The disk assembly, at least in part, thermally decouples the actuating arm from the valve actuator and includes at least two identically constructed disks with axial protrusions, which in an axial direction are directly arranged one behind the other and contact each other at the protrusions.

22 Claims, 4 Drawing Sheets

VALVE ACTUATING THERMAL DISK ASSEMBLY

CROSS-REFERENCE TO RELATED APPLICATIONS

This application claims priority to DE 10 2016 112 694.2, filed Jul. 11, 2016.

FIELD OF THE INVENTION

This invention relates to a valve actuating device, in particular for an exhaust system.

BACKGROUND

Valves with a valve actuating device are known. For more and more applications there are used valves which instead of vacuum-operated actuating arms include electric actuating arms.

The disadvantage of valves with electric actuating arms consists in that the use of electronic components becomes increasingly difficult at temperatures above 125° C. In valves which are heated up for example by hot gas of up to 950° C., it therefore is important to reduce the heat transfer from the valve actuator to the actuating arm.

It therefore is the object of the invention to provide a valve actuating device in which the actuating arm is thermally decoupled from the valve actuator and the heat transfer thus is minimized.

SUMMARY

The present invention provides a valve actuating device, in particular for an exhaust system, comprising a disk assembly, an actuating arm and a valve actuator, wherein the disk assembly is arranged between the actuating arm and the valve actuator. The disk assembly, at least in part, thermally decouples the actuating arm from the valve actuator and comprises at least two identically constructed disks with axial protrusions, which in an axial direction are arranged directly one behind the other and preferably contact each other only at the protrusions. The construction of the disk assembly with disks leads to an increased thermal resistance, as the disks contact each other only at the axial protrusions and thus the heat flow is limited due to the comparatively small cross-section of the disks. In addition, due to the design, the shortest connecting path through the disks from a first axial end of the disk assembly up to an opposite second axial end of the disk assembly is extended. The axial ends are defined by contact points with planes resting on the disk assembly at the top and at the bottom. In the sense of the invention, the shortest connecting path is understood to be the path which connects a point of the disk assembly with another point of the disk assembly by the shortest route, without the disks being left on this route, and by which the conduction of heat is effected. When there are several points on the axial, opposite planes, the two points to be connected are those with the smallest distance. The manufacturing costs are kept low by the invention, in that identically constructed disks are used for the construction of the disk assembly.

The disk assembly can be able to transmit axial forces as well as torques, as the disk assembly thus is usable for a plurality of different valve actuating devices.

The disk assembly may comprise at least three identically constructed disks, wherein directly adjacent disks contact each other only at the axial protrusions. In this way, the shortest connecting path through the disk assembly additionally is extended and the heat transfer thus is further reduced.

According to an embodiment, the disks have at least two first protrusions, which are formed by shaping and in the axial direction protrude from a disk center plane, and at least two second protrusions which in opposite axial direction protrude from the disk center plane and are formed by shaping. Since the disks include protrusions which protrude from the disk center plane on both sides, the distance between two identically constructed disks can be increased and the heat transfer by thermal radiation between two adjacent disks thus can be reduced. Furthermore, due to the design with at least two protrusions on each side and hence at least two contact points, the disk assembly has an increased stability. Manufacturing the protrusions by shaping, such as deep-drawing or pressing, also is inexpensive.

The first and the second protrusions can proceed directly from the edge of the disk. The protrusions thereby are maximally away from the disk center and the shortest connecting path through the disk assembly is extended, because in a sectional view a zigzag-shaped path of heat conduction is obtained through the disks.

The first and the second protrusions of a disk alternate in a circumferential direction, in particular wherein between each adjacent first and second protrusions an intermediate portion extending in the disk center plane is present, preferably wherein the intermediate portions have the same circumferential length as each of the first and second protrusions. Due to this design the shortest connecting path is extended, and the thermal resistance of the disk assembly is increased.

According to another embodiment, the protrusions have a contact portion extending parallel to the disk center plane and an inclined portion proceeding from a radially inner portion and extending to the contact portion. The disks thereby have a higher stability and can be manufactured at lower cost, for example by simple shaping methods.

The radially inner portion includes a flat center portion and a ring portion adjoining the center portion radially on the outside, which is formed by circumferential shaping. These portions form suitable abutment surfaces, in order to transmit forces to the disk assembly and from the disk assembly to other components.

In the radially inner portion, the disks can form differently shaped axial end face regions, so that a first and a second end face each is obtained, wherein the adjacent disks each face each other with the first or the second end faces. In this way, two adjacent disks are arranged rotated relative to each other by 180° about an axis vertical to their axial orientation.

Two disks may be arranged directly one behind the other and contact each other exclusively at the protrusions, in that protrusions of a succeeding disk rest against the protrusions of the directly preceding disk. Due to the fact that the direct connection of the actuating arm and the valve actuator only is made by the disk assembly, in which two disks arranged directly one behind the other contact each other exclusively at the protrusions, the shortest connecting path through the disk assembly is extended, while the disk assembly at the same time can be designed very compact, in particular in an axial direction.

There can be provided an end flange directly connected with the valve actuator, against which the first one of the disks rests. This end flange can be designed different as compared to the disks, in that the same, for example, comprises a connecting element which is provided for connection of the actuating arm and/or the valve actuator.

In an embodiment the disks are attached to each other at the protrusions, in particular by gluing, welding, pressing, or soldering. In this way, the stability of the disk assembly is improved and a direct and safe power transmission is ensured.

In another embodiment, the disks in an axial direction form a spring with a spring constant of at least 30 N/mm. Shocks in the axial direction and/or in the rotational direction thereby can be absorbed and a damage of the valve actuating device can be prevented.

The shortest connecting path through the disks from a first axial end of the disk assembly up to an opposite second axial end of the disk assembly can be longer than the axial distance of the first axial end to the opposite second axial end by at least a factor of 2, preferably at least a factor of 3, more preferably at least a factor of 4. The significant extension of the shortest connecting path through the disk assembly, on which the conduction of heat is effected, leads to a particularly good thermal decoupling of the first axial end of the disk assembly from the opposite second axial end of the disk assembly.

The disk assembly may include a thermal insulation material which is arranged between the disks. By this thermal insulation material, the thermal decoupling between a first axial end of the disk assembly and an opposite second axial end of the disk assembly is improved. In particular, the insulation material between the disks prevents heat from being transmitted by thermal radiation via the space between adjacent disks.

The disks can include mounting holes, in particular wherein the mounting holes are arranged in portions which lie in the disk center plane. The mounting holes serve to align the disks during installation and in this way ensure an accurate, and at the same time, an easy installation of the disk assembly.

According to another embodiment, the valve actuating device comprises a spring element which is arranged in the force flow path between the actuating arm and the valve actuator. Via the spring element, an axial force and/or a torque can be produced, which holds the valve actuator in an intended position. Furthermore, the spring element also can be provided for force compensation and/or as damping element.

These and other features may be best understood from the following drawings and specification.

DETAILED DESCRIPTION

Figure 1:
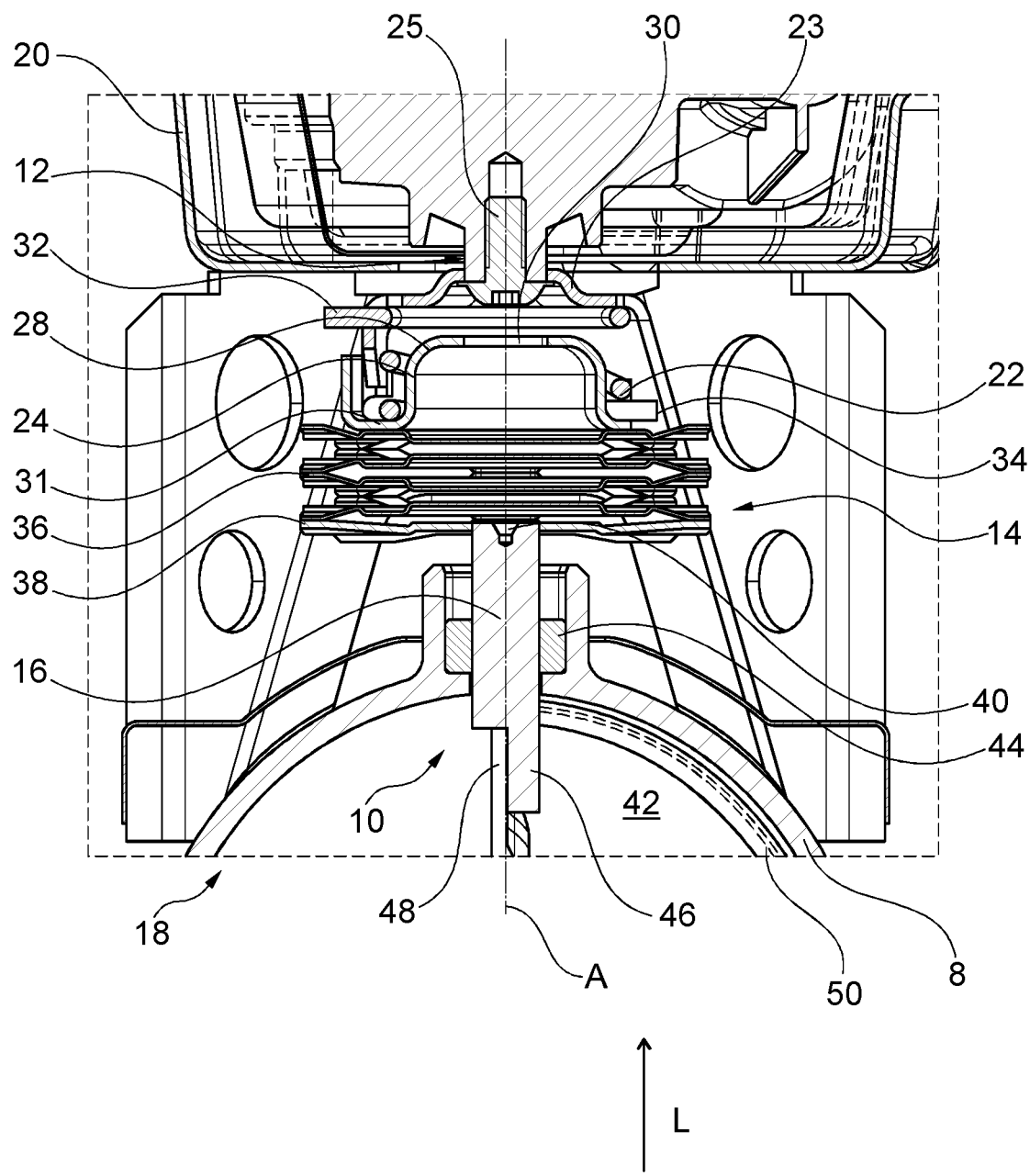
FIG. 1 shows a sectional view of a valve with a first embodiment of a valve actuating device according to the invention.

FIG. 1 shows a section through an exhaust-gas-conducting pipe of a vehicle exhaust system. Air or exhaust gas flows through the pipe. To change the flow in the pipe 8, e.g. to change a gas supply or the gas supply quantity or to direct the gas via another conduit, a valve actuating device 10 is provided at the pipe 8. The valve actuating device 10 comprises an actuating arm 12 in the form of a shaft, a disk assembly 14, and a valve actuator 16 in the form of a shaft, which are arranged axially to an axis of rotation A of the valve actuating device 10.

The valve actuating device 10 activates a valve 18 which is seated in the pipe 8.

The actuating arm 12 belongs to an electric motor 20 and is coupled with the disk assembly 14 via a spring element 22 in a direction of rotation and in an axial direction. Between the actuating arm 12 designed as shaft stub and the spring element 22 a so-called end cap 23 is seated, which is connected with the actuating arm 12 via a screw 25. A hat-shaped cap 24 adjoins the spring element 22 on the opposite side. In this case, the spring element 22 is designed as a spiral spring.

In one example, the spring constant of the spring element 22 is 5 N/mm.

The hat-shaped cap 24 has a dome-shaped portion 28 with a central hole 30, which faces away from the disk assembly 14, and a circumferential edge 31 around the dome-shaped portion 28, which is non-rotatably connected with the disk assembly 14.

The spring element 22 has a first spring end 32 and a second spring end 34, which radially are arranged opposite to each other and radially protrude to the outside beyond a cylinder jacket formed by the spiral spring.

In an axial direction L the spring element 22 rests against the end cap 23 with an axial end and against the hat-shaped cap 24 with the opposite axial end, wherein the dome-shaped portion 28 protrudes into the spring element 22 and forms a guide for the spiral spring. The first spring end 32 also is attached to the end cap 23 and the second spring end 34 is attached to the hat-shaped cap 24, so that not only axial forces, but also torques around the axis of rotation A are transmitted by the spring element 22.

The disk assembly 14 comprises four identically constructed, stacked disks 36 as well as an end flange 38 with a central connection 40, to which the valve actuator 16 is attached e.g. with a screw for example.

The valve 18 possibly comprises a pipe section and the channel 42 formed thereby as well as a pivot bearing 44 in which the valve actuator 16 is mounted.

With its end 46 opposite to the disk assembly 14, the valve actuator 16 protrudes into the channel 42 and at this end 46 is connected with a valve flap 48 which in the closed condition of the valve 18 rests against a stop 50 in the channel 42.

Figure 2:
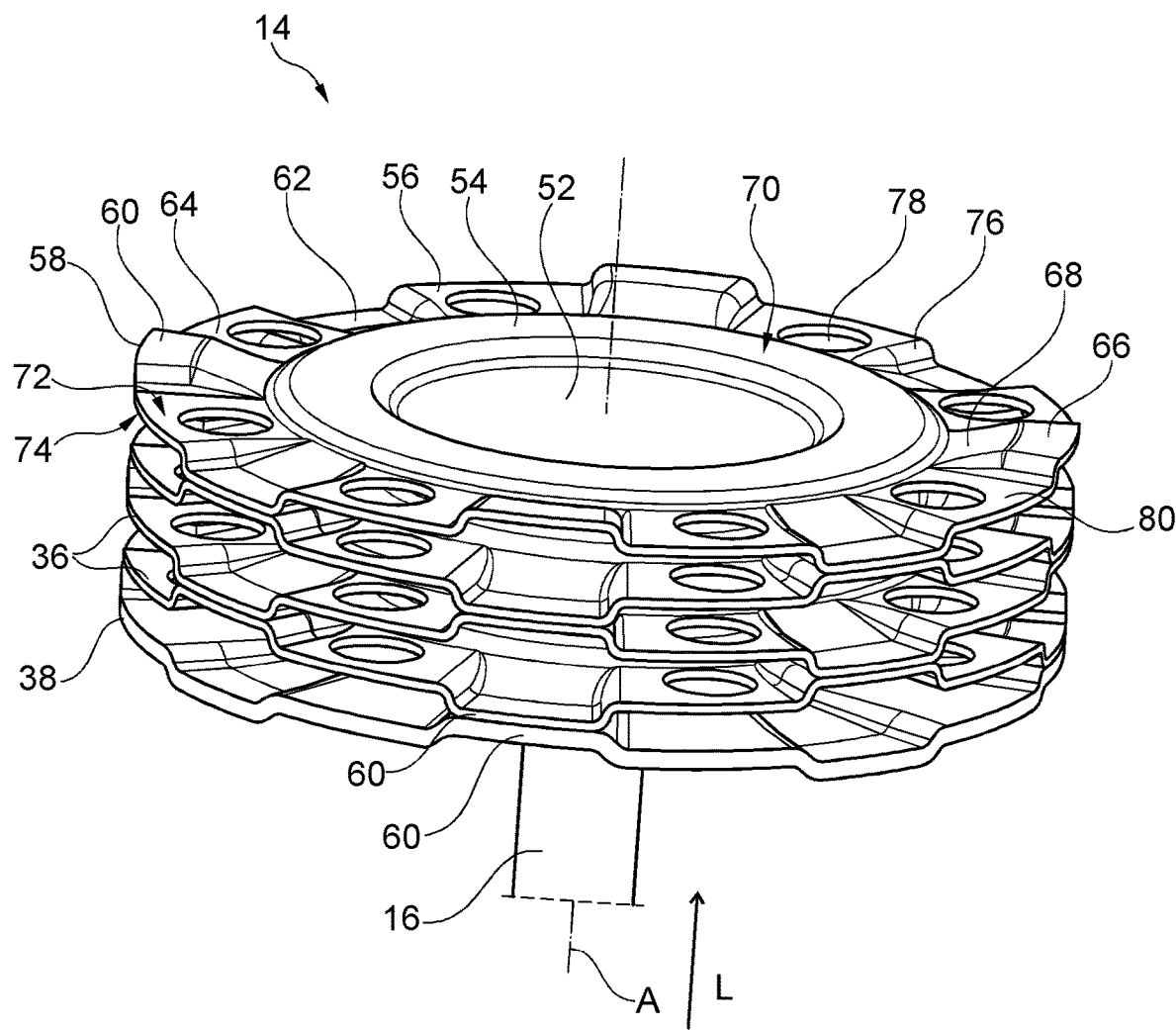
FIG. 2 shows a perspective view of the disk assembly of the valve actuating device of FIG. 1.

FIG. 2 shows the disk assembly 14 which is formed by the four identically constructed disks 36 and the disk-shaped end flange 38.

Each disk 36 is circular and, radially from the inside to the outside, comprises a flat center portion 52, a ring portion 54 adjoining the center portion 52, which is formed by axial circumferential shaping, and an edge portion 56 adjoining the ring portion 54, which extends up to the edge 58 of the disk 36.

The edge portion 56 includes e.g. four first and e.g. four second axial protrusions 60, 62, wherein the first axial protrusions 60 protrude from the disk center plane M (see FIG. 3) in the axial direction L and the second axial protrusions 62 protrude from the disk center plane M against the axial direction L.

The first and the second protrusions 60, 62 are arranged alternately in a circumferential direction. Between each adjacent first and second protrusions 60, 62 an intermediate portion 64 extending in a direction of the disk center plane M is formed.

The first and the second protrusions 60, 62 have the same shape and extend in radial direction beyond the entire edge portion 56, i.e. from the ring portion 54 up to the edge 58.

The first and the second protrusions 60, 62 have a flat contact portion 66 adjoining the edge 58 and extending parallel to the disk center plane M as well as a ramp-shaped inclined portion 68 extending between the ring portion 54 and the contact portion 66.

The intermediate portions 64 have the same circumferential length as each of the first and second protrusions 60, 62. In four first and four second protrusions 60, 62 as well as eight interposed intermediate portions 64 this means that each protrusion 60, 62 and each intermediate portion 64 forms a region of 22.5° of the edge portion 56.

The center portion 52 protrudes from the disk center plane M in the axial direction L, while the ring portion 54 protrudes from the disk center plane M against the axial direction L. In a radially inner portion 70, which is formed by the center portion 52 and the ring portion 54, the disk 36 thereby includes differently shaped end faces in the form of a first and a second end face 72, 74.

The disks 36 are relatively thin, i.e. the ratio of the disk diameter to the disk thickness d (see FIG. 3) is great, in particular greater than 100.

The disks 36 are formed of sheet metal and by shaping. All edges, which are formed by shaping, have roundings 76.

The end flange 38 can be shaped identical to the disks 36. Alternatively, the end flange 38 also can have other suitable shapes, but it preferably comprises protrusions 60, 62 with which it rests against the protrusions 60, 62 of an adjacent disk 36 (see FIG. 2).

In each of their intermediate portions 64, the disks 36 include a continuous, round mounting hole 78. The mounting holes 78 are provided for aligning the disks 36 relative to each other during installation, for example by putting a dowel pin through the same.

In the disk assembly 14, the disks 36 and the end flange 38 are arranged coaxially to the axis A.

The end flange 38 only rests against one disk 36 and forms an axial end of the disk assembly 14.

Each disk 36 is rotated relative to its directly adjacent disks 36 by 180° vertically to the axis A. In this way, in the case of directly adjacent disks 36 the first and the second end face 72, 74 of a disk 36 each are located directly opposite the first and the second end face 72, 74 of the directly adjacent disk 36.

Two disks 36 arranged directly one above the other contact each other exclusively at the contact portions 66 in that the contact portions 66 of the protrusions 60 and 62 of a succeeding disk 36 rest against the contact portions 66 of the protrusions 60, 62 of the directly preceding disk 36.

The disks 36 are welded to each other at the contact portions 66 resting against each other.

The disks 36 alternatively, or in addition, can be connected with each other by gluing, pressing, and/or soldering.

In the axial direction L, the disks 36 connected with each other form a spring with an axial spring constant of 244 N/m.

In an alternative, non-illustrated embodiment in which the valve actuating device 10 does not comprise a spring element 22, a disk assembly 14 with a spring constant of 3 to 15 N/mm can be provided, which includes the properties of the spring element 22 and thus assumes its function.

Due to the construction of the disk assembly 14, the shortest connecting path on which a heat conduction is effected comprises a repetitive labyrinth-like path, which is formed by the contact portions 66 resting against each other at first protrusions 60 of a preceding and an intermediate disk 36, an intermediate portion 64 of the intermediate disk 36, the contact portions 66 resting against each other at the second protrusions 62 of the intermediate and a succeeding disk 36 as well as an intermediate portion 64 of the succeeding disk 36. In this way, the shortest connecting path through the disks 36 from a first axial end 80 of the disk assembly 14 up to an opposite second axial end 82 of the disk assembly, which in axial direction lies below the end 80, is longer than the axial distance Y of the first axial end 80 to the opposite second axial end 82 by at least a factor of 2 (see FIG. 3).

The mounting holes 78 additionally increase the thermal resistance of the disk assembly 14, as the cross-section of the intermediate portions 64 available for the conduction of heat is reduced by the mounting holes 78 and the heat flow is forced around the respective mounting holes 78 on a longer path.

The value of the heat conduction as well as the spring constant of the disk assembly 14 can be defined by the thickness d of the disks 36 and of the end flange 38 and their material.

The purpose of the disk assembly 14 designed in this way is to increase the thermal resistance through the disk assembly 14 and hence to at least in part thermally decouple the actuating arm 12 and the valve actuator 16.

For this purpose the disks 36 furthermore have the function of cooling ribs, in that heat can be dissipated from the surfaces of the disks 36 by convection.

The spring element 22 additionally reduces the conduction of heat, in that the actuating arm 12 is in contact with the disk assembly 14 exclusively via the spring element 22, and the spring element 22 is connected with the disk assembly 14 only via the relatively small contact surface between the edge 31 of the hat-shaped cap 24 and the ring portion 54.

The spring element 22 is arranged in the force flow path, which here is a torque transmission path, of the valve actuating device 10 and provides for an axial backlash compensation.

Opening and closing of the valve 18 is effected by opening and closing of the channel 42 with the valve flap 48. For this purpose, the electric motor 20 adjusts the valve flap 48 with the valve actuating device 10 into an open or closed position.

In the closed position, the stop 50 forms the end position for the valve flap 48 which tightly closes the channel 42. On closing, the electric motor 20 overruns this end position, whereby the valve flap 48 is resiliently urged against the stop 50 by the spring element 22 and a secure end position is ensured.

Since the actuating arm 12 substantially is thermally decoupled from the valve actuator 16, the valve 18 can be used for hot media without the electric motor 20 or its electric control (not shown) being impaired. Thus, reliable switching of the valve 18 is ensured also at high temperatures in the channel 42.

Figure 3:
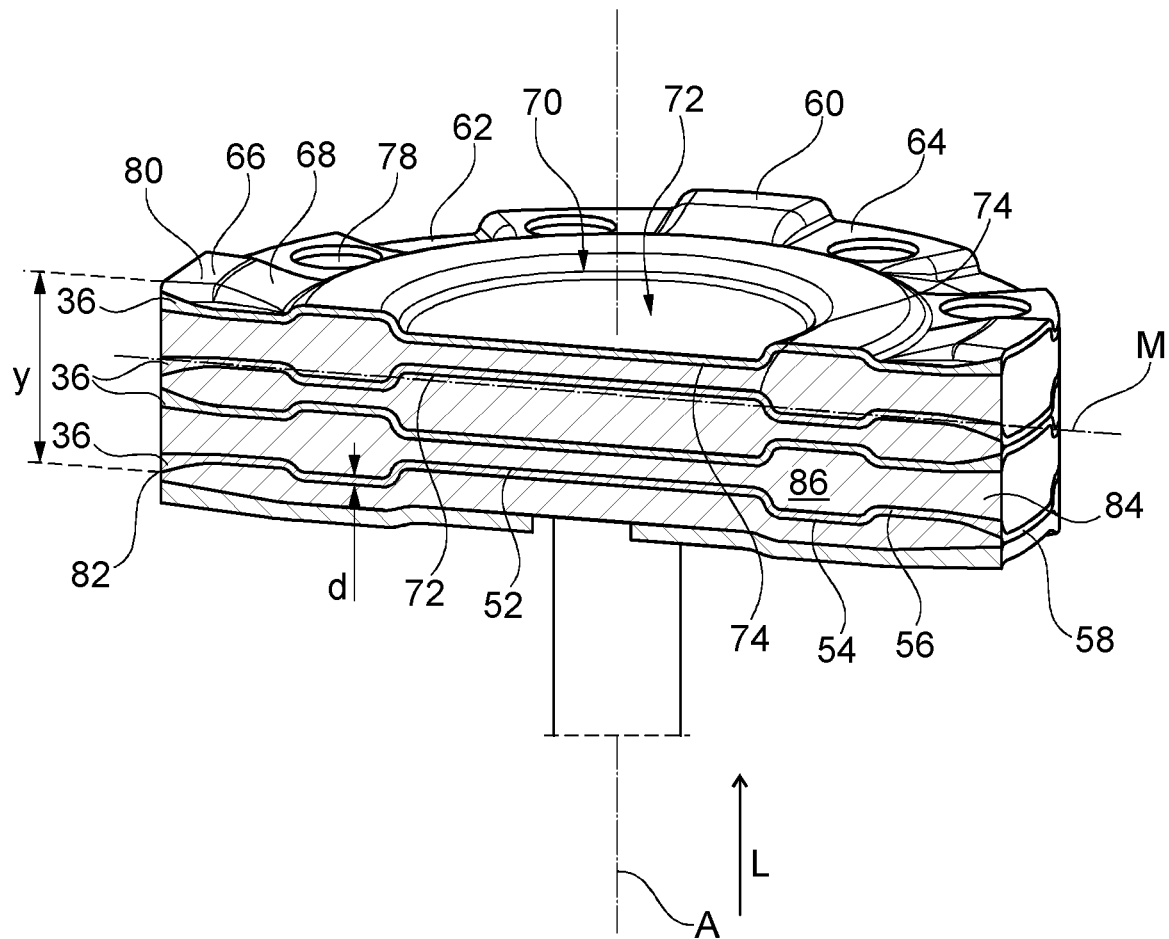
FIG. 3 shows a sectional view of a disk assembly of a second embodiment of a valve actuating device according to the invention.

The embodiment of FIG. 3 corresponds to the one of FIG. 2. As far as not described otherwise, this embodiment has the same features with the same reference numerals as the above-described disk assembly 14 of FIG. 2.

In the embodiment shown in FIG. 3, the disk assembly 14 additionally includes a thermal insulation material 84 which is arranged between the disks 36 and completely fills the spaces 86 formed by the disks 36.

The space 86 between the end flange 38 and the directly adjacent disk 36 likewise is completely filled with the thermal insulation material 84.

The thermal insulation material 84 reduces the heat quantity which can be transmitted via the spaces 86 by convection and thermal radiation, and in this way improves the thermal resistance of the disk assembly 14.

In this embodiment, the end flange 38 has a geometry differing from the disks 36, but likewise contacts the directly adjacent disk 36 exclusively at the axial protrusions 60, 62.

Figure 4:
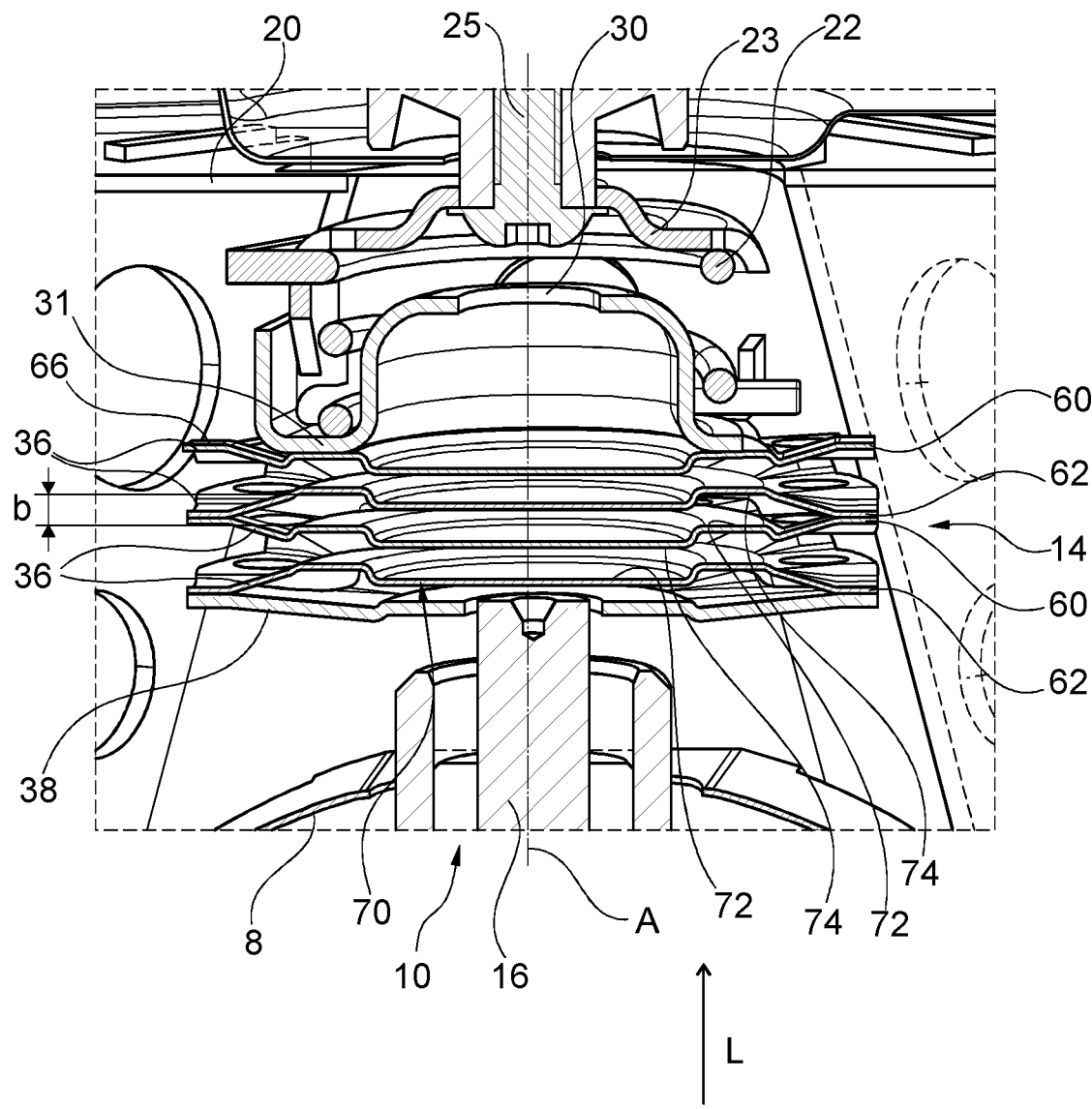
FIG. 4 shows a sectional view of a valve with a third embodiment of a valve actuating device according to the invention.

FIG. 4 shows a third embodiment of the valve actuating device 10 with an alternative construction of the disk assembly 14. All identical or functionally equivalent parts are provided with the reference numerals introduced already, so that in the following only the differences will be discussed.

The disks 36 of this disk assembly 14 are shaped like the disks 36 in FIGS. 1 to 3. Other than in the disk assemblies 14 shown in FIGS. 1 to 3, in which the disks 36 each are rotated relative to their directly adjacent disks 36 by 180° vertically to the axis A, the disks 36 of the disk assemblies 14 shown in FIG. 4 however are stacked in the same sense relative to each other, i.e. in the case of directly adjacent disks 36 the first end face 72 of a disk 36 each is opposed to the second end face 74 of the directly adjacent disk 36.

Each disk 36 is rotated relative to its directly adjacent disks 36 by a whole multiple of 45° around the axis of rotation A. In this way, two disks 36 arranged directly one above the other contact each other exclusively at the contact portions 66, in that the contact portions 66 of the protrusions 60, 62 of a succeeding disk 36 rest against the contact portions 66 of the protrusions 60, 62 of the directly preceding disk 36.

Furthermore, in this construction the distance b of the inner portions 70 of two disks 36 arranged directly one above the other is constant. This has the advantage that, in an embodiment with insulation material 84, no expensive molded part is required for the insulation material 84, but that the insulation material 84 can be a part punched out of a plate of constant thickness.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A valve actuating device comprising:
a disk assembly;
an actuating arm; and
a valve actuator, wherein the disk assembly is arranged between the actuating arm and the valve actuator, and wherein the disk assembly at least partly thermally decouples the actuating arm from the valve actuator and comprises at least two identically constructed disks with axial protrusions which in an axial direction are arranged directly one behind the other and contact each other at the axial protrusions.

2. The valve actuating device according to claim 1, wherein the disk assembly is able to transmit axial forces as well as torques.

3. The valve actuating device according to claim 1, wherein the at least two identically constructed disks comprise at least three identically constructed disks, and directly adjacent the at least three identically constructed disks only contact each other at the axial protrusions.

4. The valve actuating device according to claim 1, including an end flange directly connected with the valve actuator, and wherein a first one of the at least two identically constructed disks rests against the end flange.

5. The valve actuating device according to claim 1, wherein the at least two identically constructed disks are attached to each other at the axial protrusions.

6. The valve actuating device according to claim 1, wherein in the axial direction the at least two identically constructed disks form a spring with a spring constant of at least 30 N/mm.

7. The valve actuating device according to claim 1, wherein a shortest connecting path through the at least two identically constructed disks from a first axial end of the disk assembly to an opposite second axial end of the disk assembly is longer than an axial distance of the first axial end to the opposite second axial end by at least a factor of 2.

8. The valve actuating device according to claim 1, wherein the disk assembly includes a thermal insulation material which is arranged between the at least two identically constructed disks.

9. The valve actuating device according to claim 1, wherein the valve actuating device comprises a spring element which is arranged in a force flow path between the actuating arm and the valve actuator.

10. The valve actuating device according to claim 1, wherein the axial protrusions of the at least two identically constructed disks that contact each other extend in the axial direction toward each other.

11. The valve actuating device according to claim 1, wherein the at least two identically constructed disks with axial protrusions, which in the axial direction are arranged directly one behind the other and contact each other at the axial protrusions, contact each other only at the axial protrusions.

12. A valve actuating device comprising:
a disk assembly;
an actuating arm; and
a valve actuator, wherein the disk assembly is arranged between the actuating arm and the valve actuator, and wherein the disk assembly at least partly thermally decouples the actuating arm from the valve actuator and comprises at least two identically constructed disks with axial protrusions which in an axial direction are arranged directly one behind the other and contact each other at the axial protrusions, and wherein the axial protrusions include at least two first protrusions, which are formed by shaping and in the axial direction protrude from a disk center plane, and at least two second protrusions which in an opposite axial direction protrude from the disk center plane and are formed by shaping.

13. The valve actuating device according to claim 12, wherein the at least two first and the at least two second protrusions directly proceed from an edge of the at least two identically constructed disks.

14. The valve actuating device according to claim 12, wherein the at least two first and the at least two second protrusions of the at least two identically constructed disks alternate in circumferential direction.

15. The valve actuating device according to claim 14, wherein between each adjacent of the at least two first and the at least two second protrusions an intermediate portion extending in a direction of the disk center plane is present.

16. The valve actuating device according to claim 15, wherein the intermediate portions have a same circumferential length as each of the at least two first and the at least two second protrusions.

17. The valve actuating device according to claim 12, wherein the at least two first and the at least two second protrusions have a contact portion extending parallel to the disk center plane and an inclined portion proceeding from a radially inner portion and extending to the contact portion.

18. The valve actuating device according to claim 17, wherein the at least two identically constructed disks in the radially inner portion form differently shaped axial end face regions, so that a first and a second end face each is obtained, wherein adjacent disks of the at least two identically constructed disks each face each other with the first or the second end faces.

19. The valve actuating device according to claim 12, wherein the at least two identically constructed disks include a radially inner portion having a flat center portion and a ring portion adjoining the flat center portion radially on the outside, which is formed by circumferential shaping.

20. The valve actuating device according to claim 12, wherein two disks of the at least two identically constructed disks arranged directly one behind the other contact each other exclusively at the at least two first and the at least two second protrustions, and wherein the at least two first and the at least two second protrusions of a succeeding disk of the at least two identically constructed disks rest against the at least two first and the at least two second protrusions of a directly preceding disk of the at least two identically constructed disks.

21. A valve actuating device comprising:
a disk assembly;
an actuating arm; and
a valve actuator, wherein the disk assembly is arranged between the actuating arm and the valve actuator, and wherein the disk assembly at least partly thermally decouples the actuating arm from the valve actuator and comprises at least two identically constructed disks with axial protrusions which in an axial direction are arranged directly one behind the other and contact each other at the axial protrusions, and wherein the at least two identically constructed disks include mounting holes.

22. The valve actuating device according to claim 21, wherein the mounting holes are arranged in portions which lie in a disk center plane.

* * * * *